US006463740B1

(12) United States Patent
Schmidt et al.

(10) Patent No.: US 6,463,740 B1
(45) Date of Patent: Oct. 15, 2002

(54) COMPRESSOR STARTING TORQUE CONVERTER

(75) Inventors: William E. Schmidt, Sugar Land, TX (US); Ned P. Baudat, Sugar Land, TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/637,552

(22) Filed: Aug. 10, 2000

(51) Int. Cl.$^7$ ................................................ F16D 11/06
(52) U.S. Cl. ........................... 60/772; 60/793; 417/212; 417/223; 74/DIG. 5; 477/53; 477/57; 477/62; 477/168; 192/3.29
(58) Field of Search ......................... 477/168, 53, 57, 477/62; 60/772, 793; 74/DIG. 5; 417/212, 223; 192/3.29

(56) References Cited

U.S. PATENT DOCUMENTS

| | | | | |
|---|---|---|---|---|
| 2,339,185 A | * | 1/1944 | Nettel | 290/14 |
| 3,778,192 A | * | 12/1973 | Caffrey | 417/286 |
| 3,805,640 A | * | 4/1974 | Schneider | 74/645 |
| 3,886,729 A | | 6/1975 | Amann et al. | |
| 3,916,729 A | * | 11/1975 | Herr | 47/751 |
| 4,220,057 A | * | 9/1980 | Kronogard | 74/688 |
| 4,726,255 A | | 2/1988 | Humpfer et al. | |
| 5,966,925 A | | 10/1999 | Torikai et al. | |
| 5,989,156 A | * | 11/1999 | Matsubara | 477/169 |
| 6,068,452 A | * | 5/2000 | Okada | 417/223 |
| 6,346,784 B1 | * | 2/2002 | Lin | 318/9 |

FOREIGN PATENT DOCUMENTS

GB    1208831    10/1970

OTHER PUBLICATIONS

*Perry's Chemical Engineer's Handbook*, 5th Edition, McGraw–Hill, 1973, pp. 24–30–24–31.
"Voith Torque Converters", Product Brochure, Oct. 1998.
"Applications in the Oil and Gas Industry", Voith Turbo Product Brochure, May, 1999.

\* cited by examiner

*Primary Examiner*—Ehud Gartenberg
(74) *Attorney, Agent, or Firm*—Madan, Mossman & Sriram, P.C.

(57) ABSTRACT

The subject invention involves a compressor starting torque converter (CSTC) to enable starting up single-shaft gas turbine driven compressor sets, such as in a liquified natural gas (LNG) plant. The system includes a single-shaft gas turbine with an output shaft coaxially connected to the input shaft of the CSTC's torque converter, in turn whose output shaft drives the process load centrifugal compressor. The CSTC operates as a fluid coupling whereby the gas turbine and the compressor shafts are coupled via the working fluid (oil). Once the process load compressor is up to speed, a lock up device is engaged to mechanically couple the gas turbine directly to the compressor and then the torque converter is drained. The impeller and turbine wheel of the CSTC are undersized with regard to the maximum shaft power requirement of the compressor.

12 Claims, 2 Drawing Sheets

US 6,463,740 B1

COMPRESSOR STARTING TORQUE CONVERTER

FIELD OF THE INVENTION

The present invention relates to methods and apparatus for starting single shaft gas turbine driven or electric motor driven compressor sets, and in a further embodiment relates to methods and apparatus for starting large single shaft gas turbine driven compressor sets of greater than 43,700 horsepower.

BACKGROUND OF THE INVENTION

Present compressor plants, such as those used in liquified natural gas (LNG) plants, use either the smaller two-shaft gas turbine driver (which has no driver compressor starting problems) or the larger, more cost-effective single-shaft gas turbine driver with its presently-associated complex compressor starting method and apparatus. While two-shaft gas turbine drivers are suitable for starting compressors, they are commercially unavailable in sizes greater than 43,700 horsepower. There is a need for a device which can efficiently start single-shaft gas turbine driven centrifugal compressor sets in processes requiring total power up to 350,000 horsepower and more.

Large single-shaft gas turbines have a standard starting system that at most can only start up the gas turbine driver itself and an unloaded, connected electric generator. A specific problem with the single-shaft gas turbine is that everything is connected mechanically on a single common shaft, hence the starting device must start up not only the gas turbine itself, but also the connected load (for example, an electric generator or centrifugal compressor). Everything must be started up and accelerated simultaneously from rest continuously up to full speed. The added load produced by an electric generator in an unloaded state, that is, not connected to the electrical power grid during starting, can be handled by a single-shaft gas turbine's standard starting system, but not the inertia and aerodynamic loads associated with a large centrifugal compressor.

For starting up large, single-shaft gas turbine compressor sets, an additional starting device (an electric motor or steam turbine helper driver or engine) is typically added at the outboard free end of the driven compressor(s). This starting device can either be a steam turbine driver or an electric motor driver, which typically includes a Variable Frequency Electrical Drive system (VFD) to provide variable speed. The electric motor driver requires an external source of electric current, while the steam turbine requires an external source of steam, hence both starting device types are not independent or stand-alone devices. Because both of these systems, in turn, have many sub-systems, they are costly, complex, and are very maintenance intensive.

Further, many times because of a remote location, a plant does not have a readily available nearby electrical grid or a steam system. Steam systems require a large source of water. In addition, it is generally more economical to utilize air instead of water for cooling.

It is desirable to provide a method and apparatus to start up large loads, such as centrifugal compressors, axial compressors and the like, which is simpler, lower in cost, and requires less maintenance than the systems currently available.

SUMMARY OF THE INVENTION

Accordingly, it is an object of the present invention to provide a less costly, less complex, less maintenance-intensive, more reliable and more efficient device and method utilizing proven equipment for starting up compressors and specifically single-shaft, gas turbine-driven or electric motor-driven compressor sets.

An additional object of the invention is to provide a device and method that can be used to start up centrifugal compressors, axial compressors, and combinations thereof Another object of the present invention is to allow the more cost-effective single-shaft gas turbine to be used more readily for gas turbine compressor drivers.

In carrying out these and other objects of the invention, there is provided, in one form, a power transmission system for driving at least one compressor. The system has a driver, where one end of the shaft is the driver output shaft. A compressor starting torque converter (CSTC) is also present which has a pump impeller on an input shaft and a turbine wheel on an output shaft, where the CSTC input shaft is coaxially connected to the driver output shaft. Further, there is a compressor with an input shaft coaxially connected to the CSTC output shaft. The CSTC further comprises a lock-up device between the pump impeller and the turbine wheel to lock the impeller and the turbine wheel together. The driver may be a single shaft gas turbine or an electric motor. The compressor may be a centrifugal compressor, an axial compressor or a combination thereof.

It will be appreciated that the Figures are not to scale or proportion as it is simply a schematic for illustration purposes. Even in the schematic, the compressor starting torque converter (CSTC) is oversized with respect to the other components of the system, to show detail.

DETAILED DESCRIPTION OF THE INVENTION

The invention herein employs an improved starting method for starting compressors and specifically compressor trains driven by a single shaft gas turbine machine, such as are used in liquified natural gas (LNG) plants, namely, using a compressor starting torque converter (CSTC) located between the gas turbine output shaft and the compressor input shaft. Preferably the compressor is either a centrifugal compressor, an axial compressor or a combination of the two. Most preferably the compressor is a centrifugal compressor.

Figure 1:
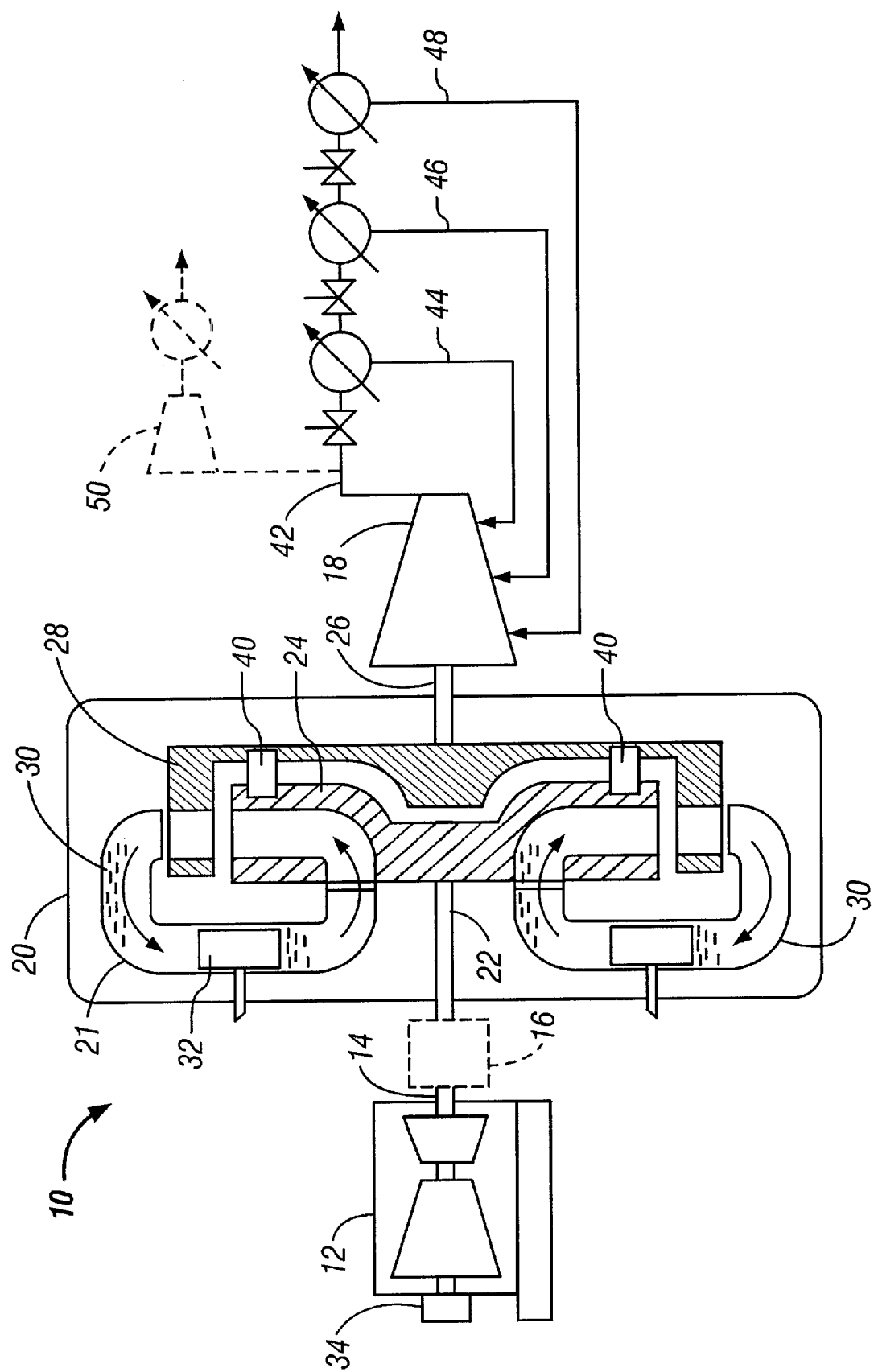
FIG. 1 is a schematic representation of one example of a typical power transmission system that would be associated with the invention.

Referring to FIG. 1 in general terms, the CSTC 20 consists of a torque converter 21 (which can be drained of its working oil 30) and a lock-up device 40 that mechanically connects the gas turbine's output shaft 14 to the driven compressor's input shaft 26. Briefly, there are two operating modes for the CSTC namely (i) "Start-Up" and (ii) "Normal Operation". "Start-Up" involves the filled torque converter 21 being in operation while in "Normal Operation", the torque converter 21 is drained and out of operation while the lock-up device 40 is engaged mechanically connecting the gas turbine 12 directly to the compressor 18 (and not via the fluid 30 in the torque converter 21 as in "Start-Up"). Briefly, in use, oil 30 is first drained from the CSTC's torque converter 21 to uncouple the driven centrifugal compressor 18 from the gas turbine 12, and then the gas turbine 12 is started conventionally. With the gas turbine 12 at minimum governing speed, the CSTC 20 is re-filled and then the centrifugal compressor 18 is started by increasing the power output from the gas turbine 12. Once the centrifugal compressor 18 is up to a speed which closely matches the gas turbine 12 speed, a lock-up device 40 is activated mechanically connecting the gas turbine to the centrifugal compressor 18.

While the invention is expected to find utility in starting up compressors for LNG plants and other closed refrigeration cycles, particularly propane refrigeration cycles, it is expected that the invention will find utility in starting and driving compressors, preferably centrifugal and/or axial compressors, in other type processes, utilizing single-shaft gas turbine drivers or electric motors.

The invention will be described more specifically with reference to FIG. 1. Shown in FIG. 1 is a power transmission system 10, having a single shaft gas turbine (GT) 12, a CSTC 20 and at least one compressor 18 with their respective shafts in coaxial alignment. A conventional gearbox 16 may be present between the output shaft 14 of the single shaft gas turbine 12 and the input shaft 22 of the CSTC 20 only if the speed of turbine 12 and required speed of compressor 18 do not match.

The CSTC 20 is an enclosed mechanical device consisting of an input shaft 22 having centrifugal pump impeller 24 thereon and an independent output shaft 26 having an associated turbine wheel 28 thereon. The working medium 30 is oil or other suitable hydraulic fluid, and when the centrifugal pump impeller 24 is rotated by having energy put into it from the gas turbine 12, the turbine wheel 28 rotates, that is, energy is transmitted out of CSTC 20 via output shaft 26. In other words, the mechanical energy input to the input shaft 22 and centrifugal pump impeller 24 is first transformed into hydraulic energy by the pump impeller 24, and then converted from hydraulic energy back into mechanical energy by the turbine wheel 28 and delivered out of CSTC 20 by output shaft 26, which in FIG. 1 is identical to the input shaft of compressor 18. The arrows in FIG. 1 show the circulation path of the oil 30.

Two shafts (22 and 26) hydraulically coupled by a fluid (oil 30) is defined as a fluid coupling, while a fluid coupling with guide vanes 32 in the fluid 30 circulation path is defined as a torque converter, a well-known machine perhaps most commonly encountered in the automatic transmission of automobiles. The orientation of the guide vanes 32 help determine the torque amplification produced by the CSTC 20.

A torque converter has a characteristic torque output (or twisting capacity) curve of maximum torque output at zero speed, with decreasing torque output at increasing speed. This is ideal because the driven compressor 18 has the exact opposite torque input requirements, and a characteristic curve of zero torque at zero speed and increasing torque with increasing speed. The excess available output torque of a torque converter at low speeds over the small input torque required by the compressor results in the ability of the gas turbine driver 12 to accelerate the large mass and inertia of the driven compressor(s) 18 from rest up to speed.

A unique feature of the CSTC 20 is the ability to drain and refill the unit of its operating fluid 30, which is the media used for transmitting energy and the transformation of energy. The mechanical shaft energy input into the CSTC 20 is transmitted by and transformed by the fluid 30 in the unit 20 into mechanical shaft output energy, when the lock up device 40 is not activated. By draining the fluid from the CSTC 20, the input shaft 22 and output shaft 26 are physically decoupled, meaning that there is no connection whatsoever between the input shaft 22 with the output shaft 26.

The basic operating principle behind the CSTC 20 (as used in the power transmission system 10 shown) is to first drain the CSTC 20 of its fluid 30, and allow the single shaft gas turbine 12's standard starting device 34 to start the gas turbine 12 itself Once operational, the starting device 34 is dropped out of operation and the gas turbine 12 brings itself up to minimum governing speed as it normally would if it were connected to an unloaded electrical generator (not shown). Conventional starting device 34 typically drops out and is disconnected once the gas turbine 12 is up to about 40% of operating speed. Such starting devices 34 or motors typically produce approximately 300 to 1,000 hp and greater. However in the case of the invention, the job is easier as there is no connected electrical generator or other load. Once the gas turbine 12 is up to speed and ready to accept load, the CSTC 20 is re-filled and the compressor(s) 18 brought up to speed by the gas turbine driver 12 through the CSTC 20 in a timed manner.

In other words, the fundamental principle is a device 20 which allows the driven compressor(s) 18 to be isolated (de-coupled) from the gas turbine driver 12, allowing the gas turbine's standard starter system 34 to start and bring the gas turbine 12 itself up to self-sustaining speed, without the driven compressor 18. When the gas turbine 12 is operational, up to minimum governing speed and ready to be loaded, the gas turbine driver 12, through the CSTC 20, starts up the compressor 18. Although torque converter 21 operation during start-up is inefficient, it is quite short term. Once locked-up, as during normal operation, the torque converter 21 is no longer in operation. An additional advantage of the invention is that start-up time is reduced significantly, as compared with prior art processes. Starting up the compressor 18 using the procedure of this invention is estimated to take from about 0.5 to about 2.0 minutes.

Although normally a single-shaft gas turbine 12 cannot start up both itself and a centrifugal compressor 18 from rest, it can start the compressor 18 once the turbine 12 itself is operational and up to speed. The CSTC 20 makes this possible. In essence, there is a two-phase start-up. First, the gas turbine 12 itself is started, then the gas turbine 12 starts the compressor 18 by means of the CSTC 20.

Figure 3:
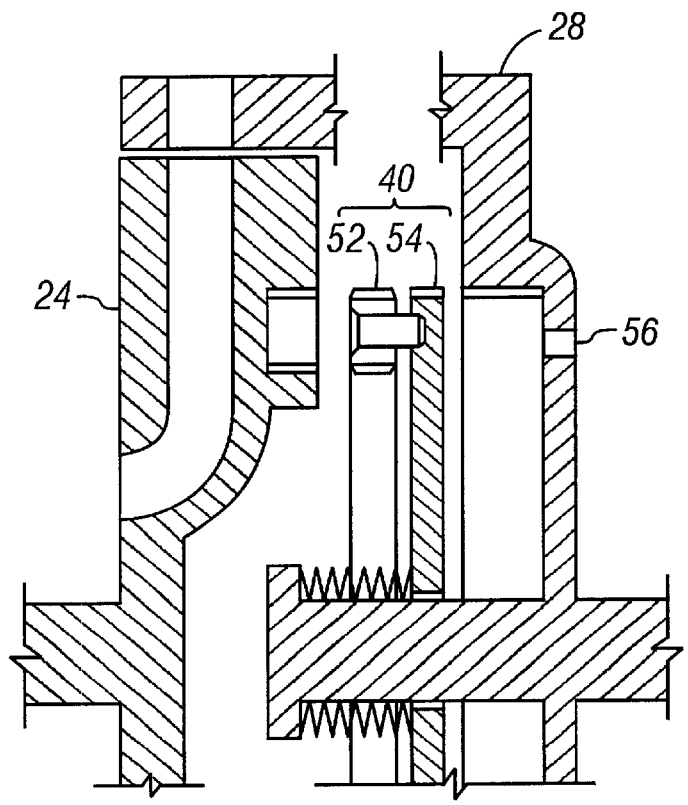
FIG. 3 is a cross-sectional detail of the lock-up device in the inventive compressor starting torque converter of the invention.

Once the compressor(s) 18 are up to speed, or output shaft 26 (compressor input shaft) speed at least closely matches (to within 2% of its speed) CSTC 20 input shaft 22 speed, lock up device 40 is engaged to physically connect gas turbine 12 to centrifugal compressor 18. Lock up device 40, shown in more detail in FIG. 3, has a circular, one piece lock-up ring 52 having teeth on the inside and outside thereof, and is mechanically bolted to a circular, single piece engagement piston 54. Hydraulic pressure moves the locking ring 52/engagement piston 54 towards the centrifugal pump impeller 24 (to the left in FIGS. 1 and 3) to physically connect pump impeller 24 with turbine wheel 28. The hydraulic fluid to move locking ring 52/engagement piston 54 is admitted through engagement piston hydraulic fluid inlet 56. The CSTC 20 thus becomes a mechanical connection device or gear coupling with extremely low power transmission loss. In one non-limiting embodiment, the transmission efficiency would be approximately 99.5% in lock-up mode (approximately 0.5% power loss). This is the "Normal Operation" Mode for the gas turbine /CSTC/ compressor unit of system 10 and in this mode, the compressor 18 would inherit the speed variation capability of the gas turbine 12.

The use of a CSTC 20 as a single-shaft gas turbine starting device in the manner of this invention would not occur to one of ordinary skill in the art because the horsepower rating of the CSTC at start-up is limited to the horsepower handling capability of the torque converter 21 itself. This torque converter 21 horsepower handling capability is much less than the horsepower transmitting capability of the CSTC 20 in the locked-up mode. That is, when faced with the problem of starting up a machine such as a compressor that may be as large as 50,000 horsepower, one would not normally think of a torque converter, since it is rated much less, and would ordinarily be thought of as unsuitable. However, as has been established, in a CSTC 20 with a lock-up device 40, the torque converter does not have to be rated at the full power of the complete system but only for the lower gradual start-up power requirement in the method of the invention. In essence, the CSTC in the locked-up "Normal Operation" mode—with the torque converter drained and out of operation handles full power. In the "Start-up" mode, the torque converter—while filled—handles the smaller compressor starting power requirement (typically approximately 25% of full power).

Figure 2:
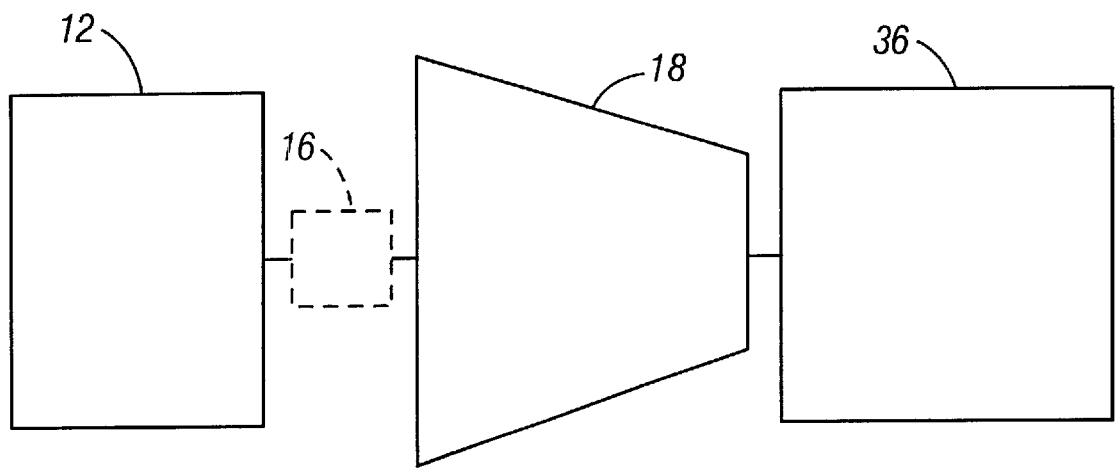
FIG. 2 is a schematic representation of a power transmission system of the prior art showing a steam turbine or electric motor driver.

Also shown in FIG. 1 is compressor discharge line 42, high stage flash gas stream 44, intermediate stage flash gas stream 46, and low stage flash gas stream 48 returning back to compressor 18. On existing processes and apparatus, as shown in prior art FIG. 2, if the start-up motor or stream turbine driver 36 (located at the free, non-driven shaft end of compressor 18) is not large enough, the gas pressure inside compressor 18 has to be reduced, typically by venting it, sometimes down to almost a vacuum, in order to get compressor 18 started. With the present invention, the compressor 18 does not have to be vented thus avoiding losing a valuable gas like propane to the atmosphere.

If the CSTC 20 or other equipment is not powerful enough to start compressor 18, one option is to add a small auxiliary compressor 50 parallel to and in the compressor discharge line 42 to draw down the pressure somewhat. Lowering the pressure in the process loop lowers compressor 18 start-up power requirements. In one non-limiting embodiment, auxiliary compressor 50 is envisioned to be a screw compressor.

An advantage of the CSTC of the invention is that it is a simple, independent, self-sufficient, stand-alone mechanical device that is not a driver or an engine, and thus does not have the complexities and costs associated with a driver or engine nor requires an external power source. While by itself, the CSTC 20 is not a starting device, when skillfully used in conjunction with a single-shaft gas turbine 12, it allows the single-shaft gas turbine 12 itself to act as the driver to start up the driven compressor(s) 18, a feat a single-shaft gas turbine normally cannot do. In other words, another complicated driver 36 is not required to start up the total gas turbine 12/compressor 18 system.

The invention permits single-shaft gas turbine drivers to be readily used instead of steam turbine drivers. Steam turbine drivers do not have centrifugal compressor start-up problems because its high pressure motive fluid (steam) is available (from a separate source) before compressor start-up while in a single-shaft gas turbine no hot motive fluid (gas from the gas turbine itself) is available until the gas turbine is started and is up and running. Gas turbines are a less costly alternative to steam turbine drivers because no steam generation equipment is needed and the cooling system is smaller. Gas turbines have a higher thermal efficiency than steam turbines, are more compact, more reliable, and offer a faster start-up. Further, the time taken to manufacture and install a gas turbine is shorter than for a comparable steam turbine system.

In another embodiment, the CSTC also can eliminate costly, special and complex motors with variable frequency drives for future motor-driven integrally-geared LNG compressors. The CSTC will allow standard, less costly and more reliable fixed speed electric motors to be used. The main drive electric motor can be started up unloaded by using a small electric motor starter with the CSTC drained mechanically isolating the main drive motor from the compressor. After the main drive electric motor is brought up unloaded to full speed and then connected to the electric grid, the CSTC can be filled and the compressor started. Although little or no speed control is available with the CSTC in this arrangement, compressor capacity control can still be obtained, for example, by adding compressor inlet guide vanes (a standard option on integrally-geared compressors employed in LNG liquefaction processes and on some normal centrifugal compressors).

An additional advantage of the invention is that if there is a process trip or problem, the invention permits only the compressor 18 or other process to cease without necessarily tripping the gas turbine 12. The procedure would be to first unload the compressor until the lock-up device can be disengaged and allow the compressor to coast to a standstill while the gas turbine is kept operational but at minimal speed. Stopping and re-starting a gas turbine is a complicated, lengthy process one tries to avoid.

A related advantage of the invention is ease of maintenance. In the present invention, the compressor 18, as one example, is automatically decoupled from the gas turbine 12 upon draining of the torque converter and the compressor can then be serviced with no fear of physical danger to repair personnel and surrounding equipment.

Starting-up a gas turbine is a complex, detailed procedure as it is by nature a minipower plant which runs hot hence rate of temperature rise throughout the machine must be regulated and controlled in a very strict manner. Thus starting-up, shutting down and restarting starting of a gas turbine is to be avoided or at least minimized as much as possible. The absolute best operating condition for a gas turbine is continuous operation as starting and stopping shortens its life and increases the required maintenance. In the present state of the art, if any component causes a problem during starting, the gas turbine most probably has to be stopped and restarted. With the CSTC 20, the gas turbine is isolated from the compressor that allows, for example, the gas turbine to be started while the compressor and the process is being readied. The gas turbine once started can be idled until the compressor and process are ready to be started. If after normal operation begins, problems occur for example with the compressor and/or the process during starting, the gas turbine does not need to be stopped and instead the CSTC 20 simply has to be drained which isolates the gas turbine. The gas turbine can be kept idling while the problem(s) in the compressor and/or process are worked out.

Further, the apparatus and controllability method of the invention is simpler than prior art start up devices and procedures, since the coupling of the compressor 18 to the gas turbine 12 can be made very quickly by draining or filling the CSTC 20 of its working oil 30.

It is also possible using the invention apparatus and method to slow roll the compressor 18 before start-up, which may be desired in some start-up sequences, such as to avoid potential vibration in compressors with long shafts. Slow rolling a single-shaft gas turbine—for example for washing the gas turbine during routine maintenance—by means of its normal starting device 34 will be simpler, quicker and easier with the torque converter 21 drained. This is because only the single-shaft gas turbine itself has to be rotated since the compressor is not connected.

In the foregoing specification, the invention has been described with reference to specific embodiments thereof, and has been demonstrated as effective in providing apparatus and procedures for starting up loads, particularly compressors. However, it will be evident that various modifications and changes can be made thereto without departing from the broader spirit or scope of the invention as set forth in the appended claims. Accordingly, the specification is to be regarded in an illustrative rather than a restrictive sense. For example, there may be other ways of configuring and/or operating the equipment differently from those explicitly described and shown herein which nevertheless fall within the scope of the claims. In an additional instance, although the invention is directed towards starting up single-shaft gas turbine driven centrifugal compressors, it will be appreciated that it could also be used for starting up single-shaft gas turbine driven axial compressors, electric motor driven centrifugal compressors and electric motor driven axial compressors.

We claim:

1. A power transmission system for driving at least one compressor comprising:
    a) a driver having a shaft, where one end of the shaft is the driver output shaft;
    b) a compressor starting torque converter (CSTC) having a pump impeller on an input shaft coaxially connected to the driver output shaft and a turbine wheel on an output shaft positioned coaxially with the pump impeller, and where the CSTC further comprises a lock-up device between the pump impeller and the turbine wheel to lock the impeller and the turbine wheel together;
    c) at least one compressor having an input shaft coaxially connected to the CSTC output shaft, said compressor having a maximum shaft power requirement, and d) said lock-up device locking said impeller and turbine wheel together at a shaft power between 25% and 100% of the maximum power requirement of the compressor, where said impeller and turbin wheel are undersized for the maximum shaft power requirement of the at least one compressor.

2. The power transmission system of claim 1 where the driver is selected from the group consisting of single shaft gas turbines and electric motors.

3. The power transmission system of claim 1 where the at least one compressor is selected from the group consisting of centrifugal compressors, axial compressors, and combinations thereof.

4. The power transmission system of claim 1 where the at least one compressor is part of a refrigeration cycle.

5. The power transmission system of claim 1 further comprising an auxiliary compressor connected to a compressor discharge line.

6. The power transmission system of claim 1 where the at least one compressor is used to compress liquified natural gas (LNG).

7. A method for starting at least one compressor, comprising:
    a) providing a power transmission system for driving at least one compressor comprising:
        i) a driver having a shaft, where one end of the shaft is the driver output shaft;
        ii) a compressor starting torque converter (CSTC) having a pump impeller on an input shaft coaxially connected to the driver output shaft and a turbine wheel on an output shaft positioned coaxially with the pump impeller, and where the CSTC further comprises a lock-up device between the pump impeller and the turbine wheel to lock the impeller and the turbine wheel together; and
        iii) at least one process load having an input shaft coaxially connected to the CSTC output shaft;
        iv) said lock-up device locking said impeller and turbine wheel together at a shaft power between 25% and 100% of the maximum power requirement of said compressor, where said impeller and turbine wheel are undersized for the maximum shaft power requirement of said compressor
    b) draining fluid from the CSTC;
    c) starting the driver;
    d) filling the torque converter with fluid; and
    e) starting the at least one compressor.

8. The method of claim 7 further comprising:
    e) engaging the lock-up device between the pump impeller and the turbine wheel of the CSTC; and
    f) draining fluid from the CSTC.

9. The method of claim 7 where the driver is selected from the group consisting of single shaft gas turbines and electric motors.

10. The method of claim 7 where the at least one compressor is selected from the group consisting of centrifugal compressors, axial compressors, and combinations thereof.

11. The method of claim 7 where in providing the power transmission system, the compressor start-up power requirements are greater than the starting output power capability of the CSTC, the system further comprises an auxiliary compressor connected to a compressor discharge line, and where the method further comprises
    g) pulling down the pressure in a compressor loop using the auxiliary compressor to lower the start-up power requirements of the at least one compressor.

12. The method of claim 7 where in providing the power transmission system, at least one compressor is part of a liquified natural gas (LNG) compression process.

* * * * *